United States Patent
Teramoto

(10) Patent No.: US 7,813,625 B2
(45) Date of Patent: Oct. 12, 2010

(54) DISC REPRODUCING APPARATUS

(75) Inventor: Kayo Teramoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1458 days.

(21) Appl. No.: 11/203,104

(22) Filed: Aug. 15, 2005

(65) Prior Publication Data
US 2006/0034590 A1    Feb. 16, 2006

(30) Foreign Application Priority Data
Aug. 16, 2004    (JP)    ............ P2004-236784

(51) Int. Cl.
*H04N 5/00*    (2006.01)
*H04N 5/91*    (2006.01)

(52) U.S. Cl. ............ 386/125; 386/65; 386/95; 386/126

(58) Field of Classification Search .......... 386/65, 386/95, 125–126
See application file for complete search history.

(56) References Cited

U.S. PATENT DOCUMENTS

| | | | | |
|---|---|---|---|---|
| 5,691,972 A | * | 11/1997 | Tsuga et al. | 369/275.3 |
| 6,088,507 A | * | 7/2000 | Yamauchi et al. | 386/95 |
| 7,130,791 B2 | * | 10/2006 | Ko | 704/3 |
| 7,542,659 B2 | * | 6/2009 | Kozuka et al. | 386/95 |

FOREIGN PATENT DOCUMENTS

| | | |
|---|---|---|
| JP | 2001-312880 | 11/2001 |
| JP | 2003-046951 | 2/2003 |
| JP | 2003-46951 | * 2/2003 |
| JP | 2004-23646 | 1/2004 |

OTHER PUBLICATIONS

Uehara Masahiro, Reproducer, Feb. 14, 2003, Machine Translation of JP 2003-046951.*

* cited by examiner

*Primary Examiner*—Thai Tran
*Assistant Examiner*—Daquan Zhao
(74) *Attorney, Agent, or Firm*—Morgan, Lewis & Bockius LLP

(57) ABSTRACT

A disc reproducing apparatus includes: a language setting section setting and storing a subtitle language; a menu language setting section setting and storing a menu language to be displayed in the menu screen in the first memory; and a second memory storing the subtitle language and the audio language used during contents reproduction. The menu language setting section has a first setting item, by which the menu language is set to the same language as the subtitle language stored in the second memory, and a second setting item, by which the menu language is set to the same language as the audio language stored in the second memory, displays the first and second setting items before one or a plurality of language selection items that are displayed in a list in a setting screen, and when the first setting item or the second setting item is selected.

8 Claims, 7 Drawing Sheets

DISC REPRODUCING APPARATUS

BACKGROUND OF THE INVENTION

1. Field of the Invention

This invention relates to a disc reproducing apparatus that reproduces a DVD or other disc containing contents including video data and audio data.

2. Description of the Related Art

In a DVD or other disc, in which video images are recorded, are also recorded information on a menu screen for selecting the reproduction of the main contents of a movie, etc., and the setting of an audio language and a subtitle language. The information includes screen information for a plurality of languages that enable the menu screen to be displayed in accordance with these languages.

A conventional disc reproducing apparatus is arranged to enable the language (referred to hereinafter as the "menu language") displayed in the menu screen to be set from an initial setting screen. FIG. 11 shows an initial setting screen for the menu language. A plurality of language selection items are listed in the setting screen and the desired language is selected by user operation. The menu language is thereby set and the language information is recorded.

With the above disc reproducing apparatus, it is troublesome to select the desired language from among the plurality of menu language selection items, and the disc reproducing apparatus is thus difficult to use.

JP-A-2003-46951 (pp. 3 to 5, FIG. 3) discloses a disc reproducing apparatus, with which the setting of the menu language can be omitted. With this disc reproducing apparatus, selection between an audio language priority mode and a subtitle language priority mode is enabled in the initial settings. When the audio language priority mode is selected, the audio language is set by the user. The main contents of the movie, etc., are thereby reproduced in the audio language that is set and without subtitles being displayed, and the menu language becomes the same as the audio language.

When the subtitle language priority mode is selected, the subtitle language is set by the user. The main contents are reproduced in the default audio language of the disc with the set subtitle language being displayed and the menu language becomes the same as the subtitle language. The menu language setting operation is thus omitted to enable the disc reproducing apparatus to be made easy to use.

SUMMARY OF THE INVENTION

However, with the disc reproducing apparatus disclosed in JP-A-2003-46951, when the audio language priority mode or the subtitle language priority mode is set, the audio language and the subtitle language cannot both be set to the user's desired languages. Also, in the case where the languages of reproduction are set by a language setting program recorded in a disc, the languages set by the initial setting of the disc reproducing apparatus will not match the languages in which the disc is being reproduced. The menu screen will thus not be displayed in the desired menu language.

Thus in the case where both the audio language and the subtitle language are to be set to the user's desired languages, these must be set individually and the menu language must also be set individually. The menu language setting operation is troublesome and this made the disc reproducing apparatus difficult to use.

An object of this invention is to provide a disc reproducing apparatus, which enables the subtitle language and the audio language to be set to desired languages and is made easy to use by reduction of the trouble of setting the menu language.

In order to achieve the above object, this invention provides a disc reproducing apparatus, reproducing a disc in which contents, including video data and audio data, and a menu screen, supporting a plurality of languages, are recorded, comprising: a language setting means, setting a subtitle language and an audio language for contents reproduction and storing the language information in a first memory; a menu language setting means, setting a menu language to be displayed in the menu screen and storing the language information in the first memory; and a second memory, storing the language information of the subtitle language and the audio language used during contents reproduction; and wherein the menu language setting means has a first setting item, by which the menu language is set to the subtitle language in which the contents are reproduced, and a second setting item, by which the menu language is set to the audio language in which the contents are reproduced, displays the first and second setting items before one or a plurality of language selection items that are displayed in a list in a setting screen, and when the first setting item or the second setting item is selected, acquires the language information from the second memory and displays the menu screen.

With this arrangement, the audio language and the subtitle language in which a disc is reproduced are set from an initial setting screen, etc., by means of the language setting means and the language information are stored in the first memory. If a program that sets the languages is not recorded in the disc, the language information stored in the first memory are copied into the second memory and the disc is reproduced in accordance with the languages corresponding to the language information stored in the second memory. In the case where a program that sets the languages is recorded in the disc, this program is started upon mounting the disc. The audio language and the subtitle language in which the disc is reproduced are thereby set, the language information are stored in the second memory, and the disc is reproduced in accordance with the languages corresponding to the language information stored in the second memory. From the initial setting screen, the first and second setting items for the menu language, such as "SAME AS SUBTITLE LANGUAGE BEING REPRODUCED" and "SAME AS AUDIO LANGUAGE BEING REPRODUCED," are made to be displayed in the setting screen by the menu language setting means, and following the first and second setting items, one or a plurality of language selection items are displayed. A user selects the desired selection item and the menu language setting is thereby stored in the first memory. If information corresponding to the first setting item or the second setting item is stored in the first memory, the language information of the subtitle language or the audio language is taken out from the second memory and the menu screen is displayed based on the language information that has been taken out. In regard to the order of display of the first and second setting items, either may come first.

This invention also provides the disc reproducing apparatus of the above arrangement, wherein the setting screen comprises a plurality of pages that are displayed switchingly by user operation and the first and second setting items are displayed in the head page.

This invention also provides a disc reproducing apparatus, reproducing a disc in which contents, including video data and audio data, and a menu screen, supporting a plurality of languages, are recorded, comprising: a menu language setting means, setting a menu language to be displayed in the menu screen and storing the language information in a first memory; and a second memory, storing the language information of a subtitle language during contents reproduction; being characterized in that the menu language setting means has a first setting item, by which the menu language is set to the subtitle language in which the contents are reproduced.

With this arrangement, from the initial setting screen, etc., selection items, including the first setting item of the menu language, such as "SAME AS SUBTITLE LANGUAGE BEING REPRODUCED," are made to be displayed in the setting screen by the menu language setting means. The user selects the desired selection item and the menu language setting is stored in the first memory. If the information corresponding to the first setting item is stored in the first memory, the language information of the subtitle language is taken out from the second memory and the menu screen is displayed based on the language information that has been taken out.

Also this invention provides the disc reproducing apparatus of the above arrangement, wherein the language information of an audio language during contents reproduction is stored in the second memory, and the menu language setting means has a second setting item, by which the menu language is set to the audio language in which the contents are reproduced. With this arrangement, from the initial setting screen, etc., selection items, including the first and second setting items of the menu language, such as "SAME AS SUBTITLE LANGUAGE BEING REPRODUCED" and "SAME AS AUDIO LANGUAGE BEING REPRODUCED," are made to be displayed in the setting screen by the menu language setting means. The user selects the desired selection item and the menu language setting is stored in the first memory. If the information corresponding to the first setting item or the second setting item is stored in the first memory, the language information of the subtitle language or the audio language is taken out from the second memory and the menu screen is displayed based on the language information that has been taken out.

This invention also provides the disc reproducing apparatus of the above arrangement, wherein, if the first setting item is selected and subtitles are not displayed during contents reproduction, the menu language is set to the language corresponding to the language information of the audio language during contents reproduction that is stored in the second memory. With this arrangement, in the case where the menu language is set by the menu language setting means to, for example, "SAME AS SUBTITLE LANGUAGE BEING REPRODUCED" and subtitles are not displayed during reproduction of the disc, the language information of the audio language is taken out from the second memory and the menu screen is displayed based on the language information that has been taken out.

This invention also provides the disc reproducing apparatus of the above arrangement, wherein the setting screen comprises a plurality of pages that are displayed switchingly by user operation and the first and second setting items are displayed in the head page.

This invention also provides a disc reproducing apparatus, reproducing a disc in which contents, including video data and audio data, and a menu screen, supporting a plurality of languages, are recorded, a disc reproducing apparatus including: a menu language setting means, setting a menu language to be displayed in the menu screen and storing the language information in a first memory; and a second memory, storing the language information of an audio language during contents reproduction; and being characterized in that the menu language setting means has a setting item, by which the menu language is set to the audio language in which the contents are reproduced.

With this arrangement, from the initial setting screen, etc., selection items, including menu language setting items, such as "SAME AS AUDIO LANGUAGE BEING REPRODUCED," are made to be displayed in the setting screen by the menu language setting means. The user selects the desired selection item and the menu language setting is stored in the first memory. If the information corresponding to the above setting item is stored in the first memory, the language information of the audio language is taken out from the second memory and the menu screen is displayed based on the language information that has been taken out.

This invention also provides the disc reproducing apparatus of the above arrangement, wherein the setting screen comprises a plurality of pages that are displayed switchingly by user operation and the setting item are displayed in the head page.

This invention also provides the disc reproducing apparatus of the above arrangement, further comprising: a language setting means, setting the subtitle language and audio language for contents reproduction and storing the language information in the first memory; and a copying means, copying the language information of the subtitle language and the audio language, which are stored in the first memory, into the second memory.

With this arrangement, the audio language and the subtitle language in which a disc is reproduced are set from the initial setting screen, etc., by means of the language setting means and the language information are stored in the first memory. If a program that sets the languages is not recorded in the disc, the language information stored in the first memory are copied into the second memory and the disc is reproduced in accordance with the languages corresponding to the language information stored in the second memory. In the case where a program that sets the languages is recorded in the disc, this program is started upon mounting the disc. The audio language and the subtitle language in which the disc is reproduced are thereby set, the language information are stored in the second memory, and the disc is reproduced in accordance with the languages corresponding to the language information stored in the second memory.

This invention also provides a disc reproducing apparatus, reproducing a disc in which contents, including video data and audio data, and a menu screen, supporting a plurality of languages, are recorded, comprising: a language setting means, setting a subtitle language and an audio language for contents reproduction; and a menu language setting means, setting a menu language to be displayed in the menu screen; and being characterized in that the menu language setting means has a first setting item, by which the menu language is set to the same language as the subtitle language set by the language setting means, and a second setting item, by which the menu language is set to the same language as the audio language set by the language setting means, and displays the first and second setting items before one or a plurality of language selection items that are displayed in a list in a setting screen.

With this arrangement, the audio language and the subtitle language in which a disc is reproduced are set from the initial setting screen, etc., by means of the language setting means. In the setting screen, the menu language setting means displays the first and second setting items of the menu language, such as "SAME AS SUBTITLE LANGUAGE" and "SAME AS AUDIO LANGUAGE" and displays the plurality of language selection items after the first and second setting items. The user selects the desired selection item and the menu language setting is thereby set. Where the first setting item or the second setting item is set, the language information of the subtitle language or the audio language set by the language setting means is taken out and the menu screen is displayed in the language corresponding to the language information that has been taken out. In regard to the order of display of the first and second setting items, either may come first.

This invention also provides the disc reproducing apparatus of the above arrangement, wherein the setting screen comprises a plurality of pages that are displayed switchingly by user operation and the first and second setting items are displayed in the head page.

This invention also provides the disc reproducing apparatus of the above arrangement, wherein the setting screen comprises a plurality of pages that are displayed switchingly by user operation and the first and second setting items are displayed in each page.

This invention also provides a disc reproducing apparatus, reproducing a disc in which contents, comprising video data and audio data, and a menu screen, supporting a plurality of languages, are recorded, comprising: a memory, storing the language information of a subtitle language and an audio language during contents reproduction; and being characterized in that a menu language that is displayed in the menu screen comprises the language corresponding to the language information of the subtitle language that is stored in the memory. With this arrangement, the subtitle language and the audio language in which the disc is reproduced are set by the disc reproducing apparatus or a program stored in the disc and the language information are stored in the memory. The reproduction of the disc is thus carried out in the languages that are in accordance with the language information stored in the memory. When the menu screen is called, the language information of the subtitle language that is stored in the memory is taken out and the menu screen is displayed in the language corresponding to the language information that has been taken out.

This invention also provides the disc reproducing apparatus of the above arrangement, wherein if subtitles are not displayed during contents reproduction, the menu language comprises the language corresponding to the language information of the audio language that is stored in the memory. With this arrangement, in the case where subtitles are not displayed during contents reproduction, the language information of the audio information that is stored in the memory is taken out when the menu screen is called and the menu screen is displayed in the language corresponding to the language information that has been taken out.

With this invention, since the first and second setting items, such as "SAME AS SUBTITLE LANGUAGE BEING REPRODUCED," "SAME AS AUDIO LANGUAGE BEING REPRODUCED," "SAME AS SUBTITLE LANGUAGE," "SAME AS AUDIO LANGUAGE," etc., are displayed before the language selection items in the process of setting the menu language, the user is relieved of the trouble of finding the desired item from among a plurality of languages and can readily set the first or the second setting item. A disc reproducing apparatus that is easy to use is thus provided.

Also with this invention, since the first and second setting items are displayed in the head page of the menu language setting screen, the menu language can be set more simply.

Also with this invention, since the first and second setting items are displayed in each page of the menu language setting screen, the menu language can be set more simply.

Also with this invention, since the same language as the subtitle language or the audio language during contents reproduction can be set as the menu language, even when the subtitle language and the audio language are set by-instructions recorded in the disc, the menu screen can be displayed in the same language as a language during reproduction. A disc reproducing apparatus that is easier to use can thus be provided.

Also with this invention, since the menu screen is displayed in the same language as the subtitle language or the audio language during contents reproduction, the setting of the menu language is not required and a disc reproducing apparatus that is easier to use can be provided.

DETAILED DESCRIPTION OF THE PREFFERED EMBODIMENTS

Figure 1:
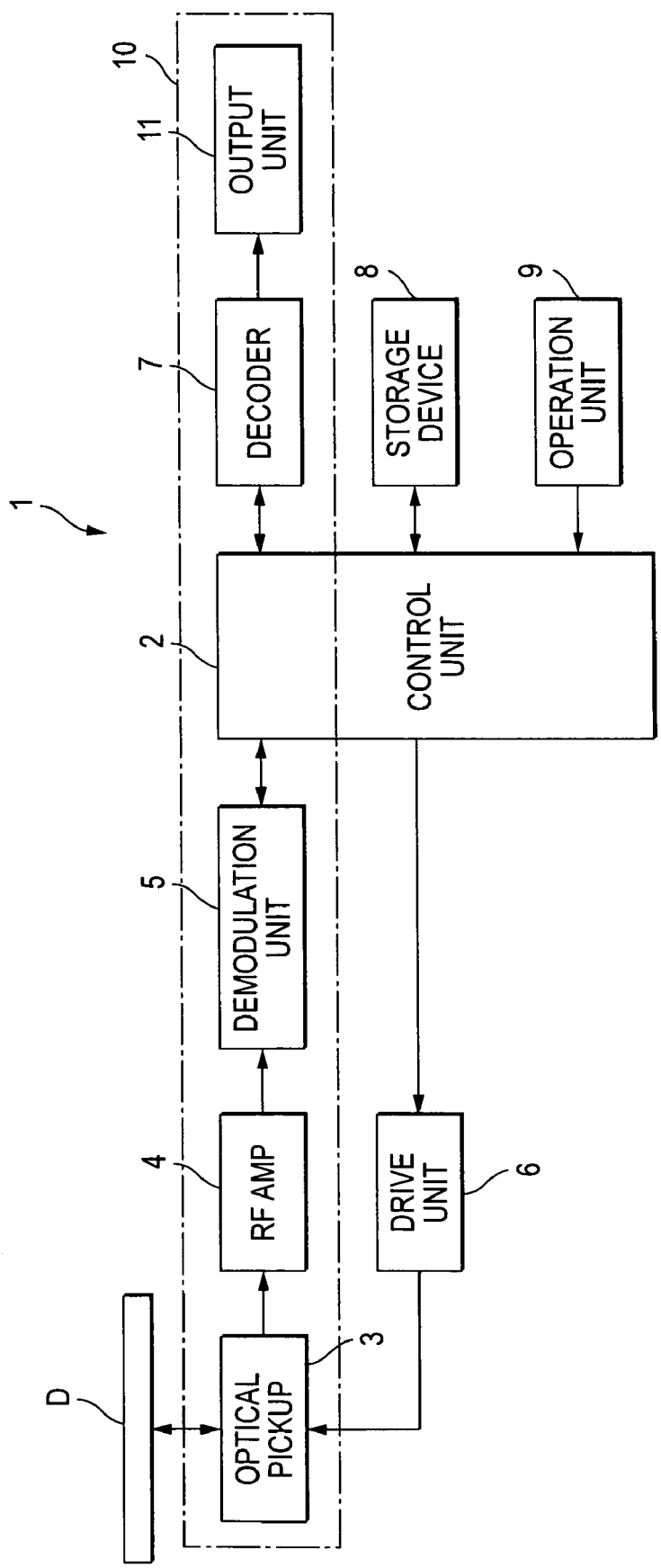
FIG. 1 is a block diagram showing the arrangement a disc reproducing apparatus of a first embodiment of this invention.

Embodiments of this invention will now be described with reference to the drawings. FIG. 1 is a block diagram of a disc reproducing apparatus of a first embodiment. The disc reproducing apparatus 1 has a control unit 2, which controls various units. A demodulation unit 5, a drive unit 6, a decoder 7, a storage device 8, and an operation unit 9 are connected to the control unit 2.

The drive unit 6 drives an optical pickup 3, which reads information written in a disc D. An RF amplifier 4 is connected to the optical pickup 3, and the demodulation unit 5 is connected to the RF amplifier 4. The RF amplifier 4 amplifies high-frequency detection signals detected by the optical pickup 3. The demodulation unit 5 demodulates data from the detection signals detected by the RF amplifier 4.

The decoder 7, connected to the control unit 2, decodes the data demodulated by the demodulation unit 5. An output unit 11 is connected to the decoder 7 and outputs the decoded data. A display device (not shown), which displays images, is connected to the output unit 11. A reproducing unit 10, which reproduces video data and audio data written in disc D, is thus arranged from the optical pickup 3, the RF amplifier 4, the demodulation unit 5, the control unit 2, the decoder 7, and the output unit 11.

The operation unit 9 that is connected to the control unit 2 is provided in a main unit of the disc reproducing apparatus 1 or a remote controller (not shown) that can communicate with the main unit and provides various instructions to the control unit 2 in accordance with user operations. The storage device 8 comprises an EEPROM or RAM, etc., and stores a program for driving the disc reproducing apparatus 1 and temporarily stores the calculation results, etc., of the control unit 2.

Figure 2:
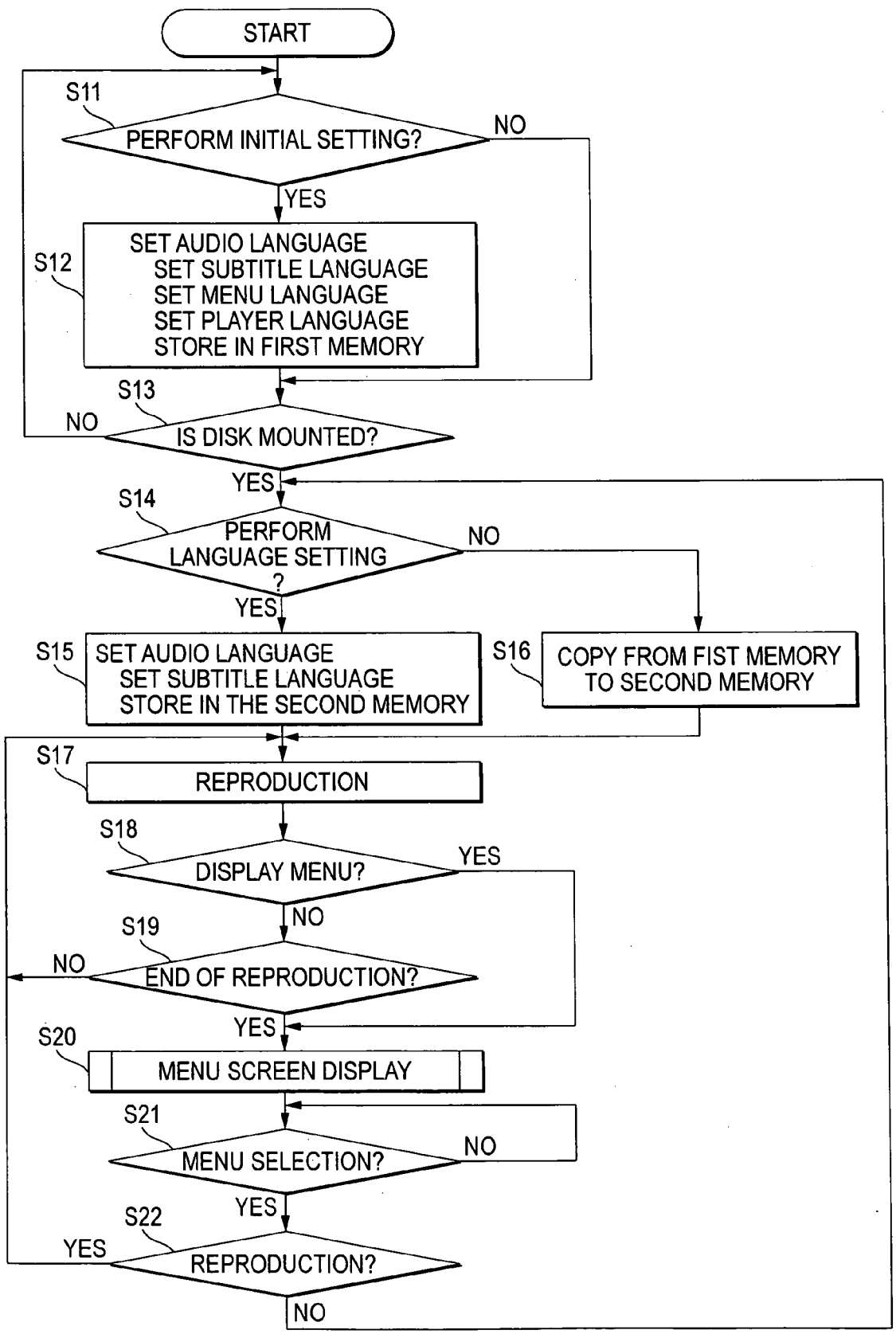
FIG. 2 is a flowchart illustrating the operations of the disc reproducing apparatus of the first embodiment of this invention.

FIG. 2 is a flowchart illustrating the operations of the disc reproducing apparatus 1. When the power of the disc reproducing apparatus 1 is turned on, the program stored in the storage device 8 is started. In step S11, whether or not initial setting of the disc reproducing apparatus 1 is to be performed is inquired. If initial setting is not to be performed, step S13 is entered.

If initial setting is to be performed, step S12 is entered. Contents, comprising the video data and audio data of the main contents, the moviemaking scenes, etc., of a movie, are recorded in the disc D. Also recorded is a menu screen for selecting among the reproduction of the main contents, the reproduction of the moviemaking scenes, the display of a language setting screen, etc. Furthermore, a plurality of subtitle languages and audio languages for reproducing the contents and a plurality of menu languages for displaying the menu screen are stored in the disc D.

Figure 4:
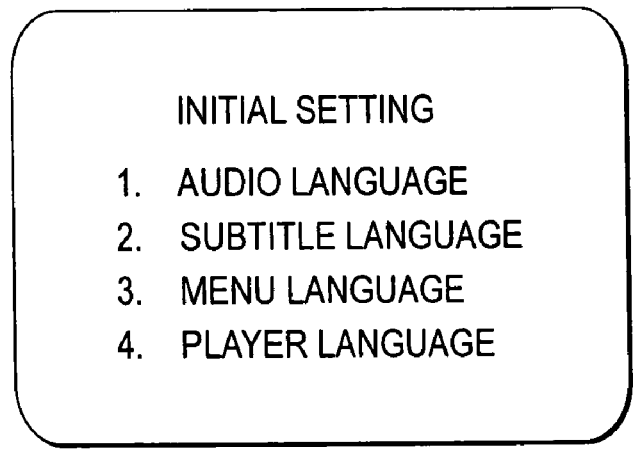
FIG. 4 is a diagram showing an initial setting screen of the disc reproducing apparatus of the first embodiment of this invention.

In step S12, an initial setting screen, such as shown in FIG. 4, is displayed. In the initial setting screen, the selection items of "audio language," "subtitle language," and "menu language," which are to be used in the reproduction of the disc D, and "player language," which is displayed at a display portion of the disc reproducing apparatus 1, are displayed, and transition to setting screens for the respective selection items is enabled.

A user thereby sets the audio language, subtitle language, menu language, and player language and the language codes (language information) of the respective languages are stored in a first memory (not shown) provided in the storage device 8. A language setting means that sets the audio language and the subtitle language and a menu language setting means that sets the menu language are thus arranged.

Figure 5:
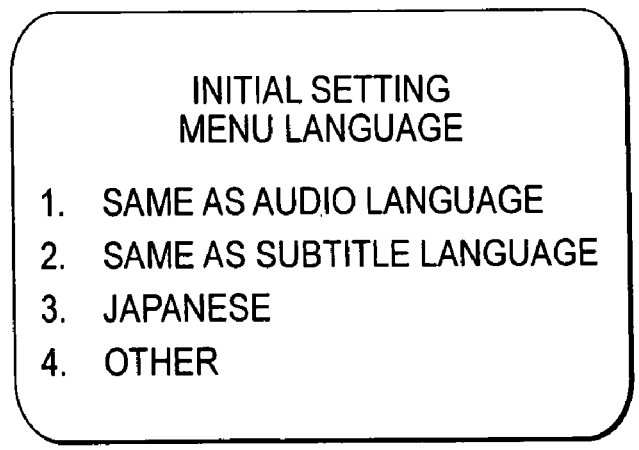
FIG. 5 is a diagram showing a menu language setting screen of the disc reproducing apparatus of the first embodiment of this invention.

FIG. 5 shows a menu language setting screen that is displayed by the menu language setting means. The setting screen comprises a plurality of pages that are switched by user operation, the first selection item of the head page is: "SAME AS AUDIO LANGUAGE;" and the second selection item is: "SAME AS SUBTITLE LANGUAGE." The respective language selection items of Japanese, English, French, etc., are listed thereafter and in the next page onwards. There may be just one language selection item, such as Japanese.

When the "SAME AS AUDIO LANGUAGE" setting item (second setting item) is selected, the menu screen is displayed in the menu language of the same language as the audio language that is set by the language setting means. When the "SAME AS SUBTITLE LANGUAGE" setting item (first setting item) is selected, the menu screen is displayed in the menu language of the same language as the subtitle language that is set by the language setting means.

In step S13, whether or not the disc D has been mounted is judged. While the disc D is not mounted, steps S11 to S13 are performed repeatedly. When the disc D is mounted, step S14 is entered. In step S14, it is judged whether or not a language setting program, which sets the subtitle language and the audio language for reproduction of the contents, is recorded in the disc D.

If the language setting program is recorded in the disc D, step S15 is entered and the language setting program is started. The subtitle language and the audio language for contents reproduction are thereby set and the language codes are stored in a second memory (not shown) of the storage device 8. If the language setting program is not recorded in the disc D, step S16 is entered. In step S16, the storage contents of the first memory are copied into the second memory. A copying means is thus arranged.

In step S17, the main contents of the disc D are reproduced. Here, the language codes of the audio language and the subtitle language that are stored in the second memory are taken out and the audio and subtitles in the languages corresponding to these language codes are output. The language codes of default audio, subtitle, and menu languages are stored in advance in the first and second memories, and if language setting by the initial setting or the language setting program is not carried out, reproduction in the default languages is carried out.

Figure 3:
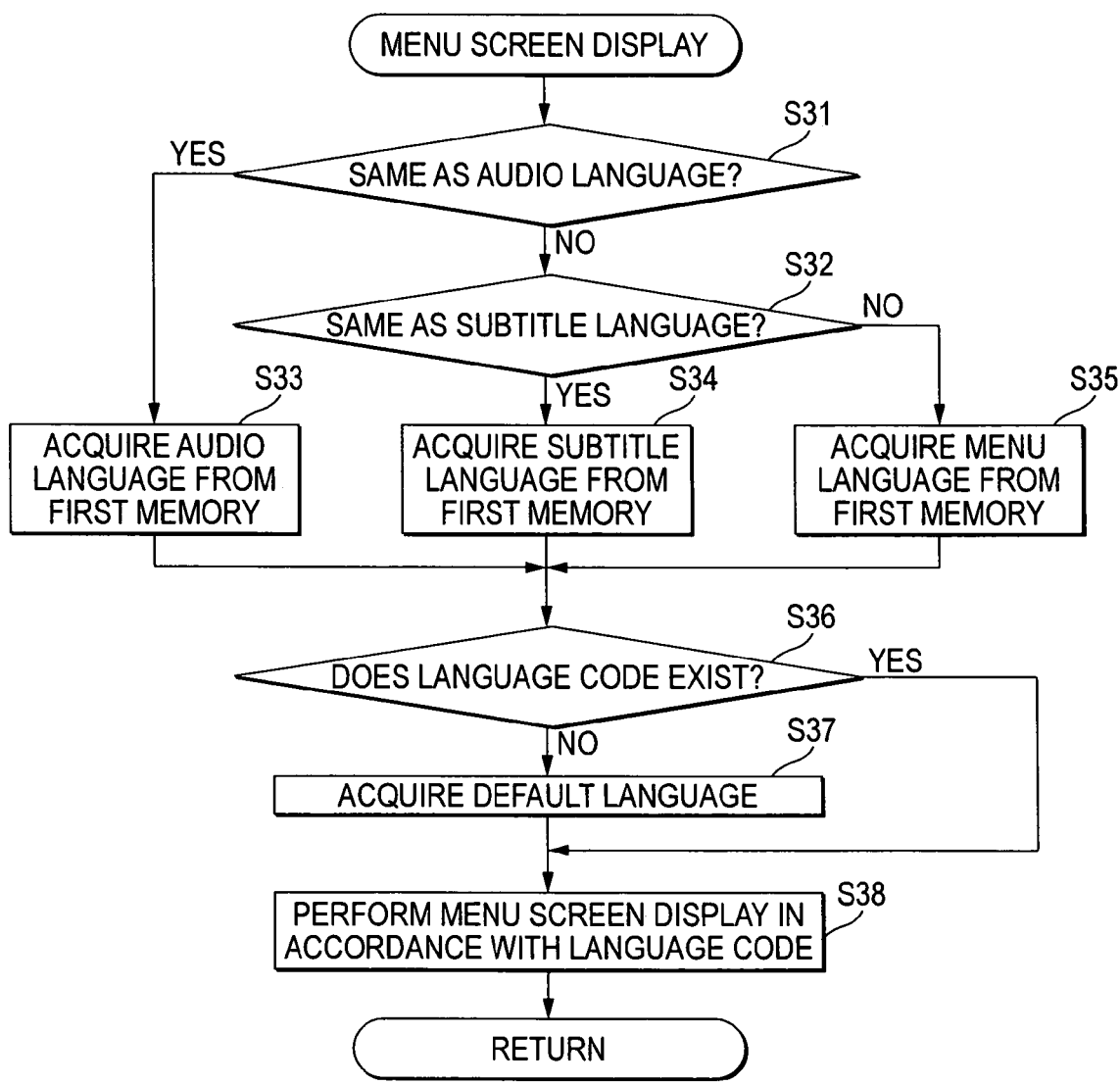
FIG. 3 is a flowchart illustrating the operations of a menu screen display process of the disc reproducing apparatus of the first embodiment of this invention.

In step S18, whether or not the display of the menu screen is instructed by an operation of the operation unit 9 is judged. If the display of the menu screen is not instructed, step S19 is entered and whether or not the reproduction of the main contents has ended is judged. If the reproduction of the main contents has not ended, a return to step S17 is performed and the reproduction is continued. If the display of the menu screen is instructed or if the reproduction of the main contents has ended, step S20 is entered and the menu screen display process, shown in FIG. 3, is called.

In step S31 of the menu screen display process, whether or not the "SAME AS AUDIO LANGUAGE" setting item has been selected in the menu language setting of step S12 is judged. If the "SAME AS AUDIO LANGUAGE" setting item has been selected, step S33 is entered and the language code of the audio language is acquired from the first memory.

If the "SAME AS AUDIO LANGUAGE" setting item has not been selected, whether or not the "SAME AS SUBTITLE LANGUAGE" setting item has been selected is judged in step S32. If the "SAME AS SUBTITLE LANGUAGE" setting item has been selected, step S34 is entered and the language code of the subtitle language is acquired from the first memory. If the "SAME AS SUBTITLE LANGUAGE" setting item has not been selected, step S35 is entered and the language code of the menu language is acquired from the first memory.

In step S36, it is judged whether or not the language code acquired in any of steps S33 to S35 exists in a table of languages displayable in the menu screen, which is recorded in the disc D. If the language code acquired in any of steps S33 to S35 exists in the language table, step S38 is entered. If the language code acquired in any of steps S33 to S35 does not exist in the language table, the language code of the default language that is recorded in the disc D is acquired in step S37.

Figure 6:
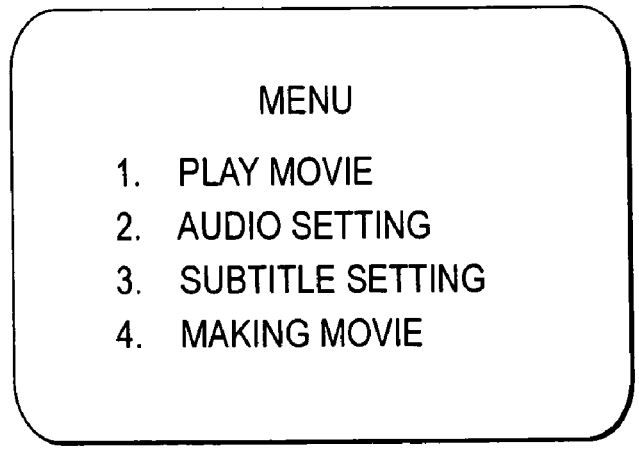
FIG. 6 is a diagram showing a display state of a menu screen of the disc reproducing apparatus of the first embodiment of this invention.
Figure 7:
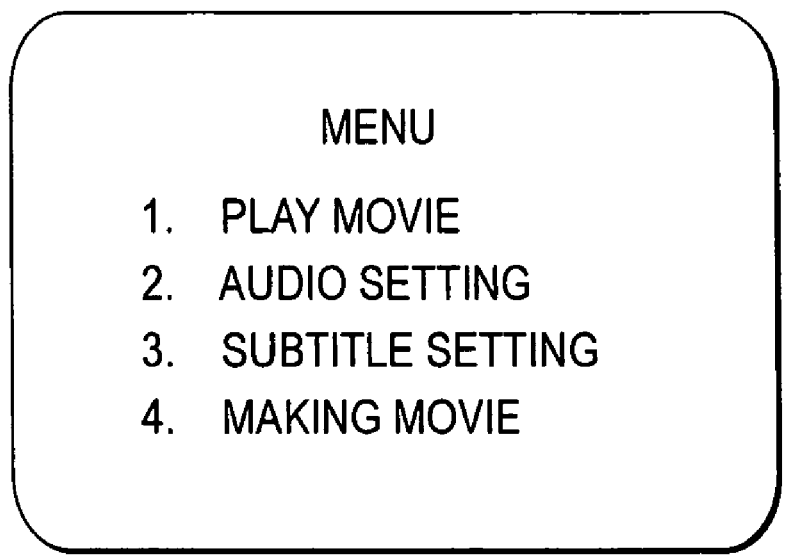
FIG. 7 is a diagram showing the display state of the menu screen of the disc reproducing apparatus of the first embodiment of this invention.

In step S38, the menu screen is displayed in accordance with the menu language corresponding to the acquired language code. FIG. 6 and FIG. 7 show menu screen examples in which the menu languages are Japanese and English, respectively. When the menu screen is displayed, a return to the flowchart of FIG. 2 is performed.

In step S21 of FIG. 2, waiting is performed until a selection item of the menu is selected. When a selection item is selected and if it is judged in step S22 that the reproduction of contents, such as the main contents or the moviemaking scenes, etc., is selected, step S17 is entered and the same operations as those described above are carried out. If the setting of the subtitle language or the setting of the audio language is selected, step S14 is entered and the same operations as those described above are carried out. In this case, when the language setting ends, a return to the menu screen of step S20 is carried out.

With the present embodiment, the audio language and the subtitle language can be set to desired languages, and in the menu language setting screen, a selection can be made between the first setting item of setting the same language as the subtitle language set by the language setting means and the second setting item of setting the same language as the audio language. Thus even if the subtitle language and the audio language are changed, the menu language does not have to be changed, and the disc reproducing apparatus 1 that is easy to use can thus be provided.

Also, since in the menu language setting screen, the first and second setting items are displayed so as to be positioned before the language selection items, the trouble of finding the selection item is reduced, thus enabling the provision of the disc reproducing apparatus 1 that is even easier to use. Furthermore, since the first and second setting items are positioned at the head page of the setting screen comprising a plurality of pages, the trouble of finding the selection items can be reduced further. The first and second setting items may also be positioned in each page of the plurality of pages.

Figure 8:
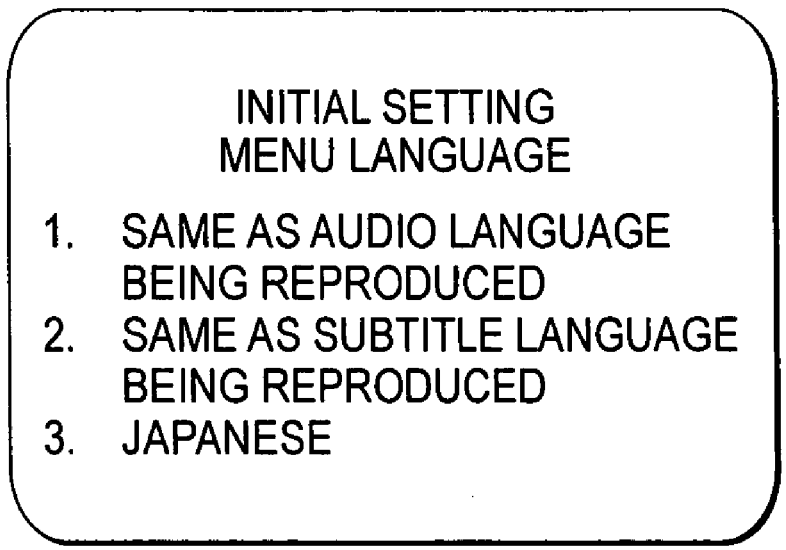
FIG. 8 is a diagram showing the menu language setting screen of the disc reproducing apparatus of a second embodiment of this invention.

A second embodiment shall now be described. The disc reproducing apparatus 1 of this embodiment is arranged in the same manner as the first embodiment but differs in the operations of the initial setting and menu screen display processes. The other portions are the same as those of the first embodiment. FIG. 8 shows the present embodiment's menu language setting screen that is displayed by the menu language setting means in step S12 (see FIG. 2).

This setting screen comprises a plurality of pages that are switched by user operation, the first selection item of the head page is "SAME AS AUDIO LANGUAGE BEING REPRODUCED," and the second selection item is "SAME AS SUBTITLE LANGUAGE BEING REPRODUCED." The respective language selection items of Japanese, English, French, etc., are listed thereafter and in the next page onwards. There may be just one language selection item, such as Japanese.

When the "SAME AS AUDIO LANGUAGE BEING REPRODUCED" setting item (second setting item) is selected, the menu screen is displayed in the menu language corresponding to the language code of the audio language that is stored in the second memory, which is referenced during the contents reproduction. When the "SAME AS SUBTITLE LANGUAGE BEING REPRODUCED" setting item (first setting item) is selected, the menu screen is displayed in the menu language corresponding to the language code of the subtitle language that is stored in the second memory.

Figure 9:
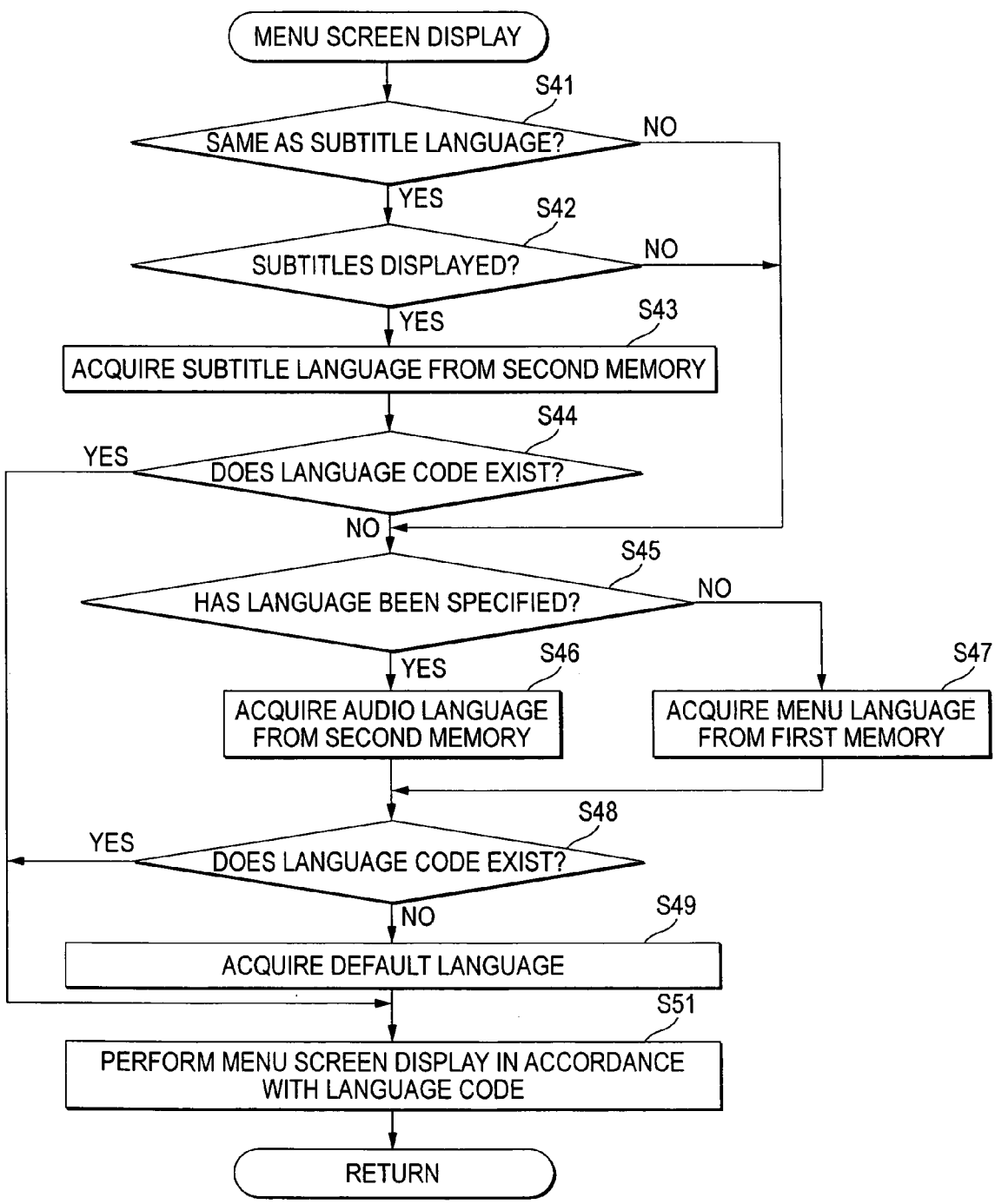
FIG. 9 is a flowchart illustrating the operations of the menu screen display process of the disc reproducing apparatus of the second embodiment of this invention.

FIG. 9 is a flowchart showing the operations of the menu screen display process. In step S41, whether or not the "SAME AS SUBTITLE LANGUAGE BEING REPRODUCED" has been selected in the initial setting of the menu language is judged. If the "SAME AS SUBTITLE LANGUAGE BEING REPRODUCED" setting item has not been selected, step S45 is entered. If the "SAME AS SUBTITLE LANGUAGE BEING REPRODUCED" selection item has been selected, step S42 is entered, and whether or not subtitles are displayed during the contents reproduction is judged. If subtitles are not displayed, step S45 is entered.

If subtitles are displayed, the language code of the subtitle language is acquired from the second memory in step S43. In step S44, it is judged whether or not the language code acquired in step S43 exists in the table of languages displayable in the menu screen, which is recorded in the disc D. If the language code acquired in step S43 exists in the language table, step S51 is entered. If the language code acquired in step S43 does not exist in the language table, step S45 is entered.

In step S45, it is judged whether or not Japanese or any of the other languages has been selected in the initial setting of the menu language. If a specific language has been selected, step S47 is entered and the language code of the menu language is acquired from the first memory. If a specific language has not been selected either the "SAME AS AUDIO LANGUAGE BEING REPRODUCED" selection item or the "SAME AS SUBTITLE LANGUAGE BEING REPRODUCED" selection item must have been selected. In this case, step S46 is entered and the language code of the audio language is acquired from the second memory.

In step S48, whether or not the language code acquired in either of steps S46 and S47 exists in the language table displayable in the menu screen, which is recorded in the disc D, is judged. If the language code acquired in either of steps S46 and S47 exists in the language table, step S51 is entered.

If the language code acquired in either of steps S46 and S47 does not exist in the language table, the language code of the default language that is recorded in the disc D is acquired in step S49.

In step S51, the menu screen is displayed with the language corresponding to the acquired language code as the menu language. The same menu screen as that of FIG. 6 or FIG. 7 is thereby displayed. When the menu screen is displayed, a return to the flowchart of FIG. 2 is performed.

As with the first embodiment, with the present embodiment, since a selection, between the first setting item of setting same language as the subtitle language during contents reproduction and the second setting item of setting the same language as the audio language, can be made in the menu language setting screen, even if the subtitle language and the audio language are changed, the menu language does not have to be changed and the disc reproducing apparatus 1 that is easy to use can thus be provided.

Also, since in the menu language setting screen, the first and second setting items are displayed so as to be positioned before the language selection items, the trouble of finding the selection item is reduced to enable the provision of the disc reproducing apparatus 1 that is even easier to use. Furthermore, since the first and second setting items are positioned at the head page of the setting screen comprising a plurality of pages, the trouble of finding the selection items can be reduced further.

In addition, even if the subtitle language and the audio language are set by a program recorded in the disc D, the menu screen can be displayed in a menu language that is the same as the subtitle language or the audio language in which the contents are reproduced. The disc reproducing apparatus 1 that is easier to use can thus be provided. Also, even when the menu language is set to the same language as the subtitle language in which the contents are reproduced, if subtitles are not displayed, the menu language is set to the same language as the audio language in which the contents are reproduced. User operations can thus be omitted.

Although the menu language can be set by the menu language setting means to either the same language as the subtitle language during contents reproduction or the same language as the audio language during contents reproduction, even if only one of either can be set, the disc reproducing apparatus 1 that is easier to use than the conventional device can be provided.

A third embodiment shall now be described. The disc reproducing apparatus 1 of this embodiment is arranged in the same manner as the first and second embodiments but differs in the operations of the initial setting and menu screen display processes. The other portions are the same as those of the first and second embodiments. With the present embodiment, the menu language setting means, which sets the menu language in accordance with user operation in the initial setting, is omitted, and the menu language is set automatically.

Figure 10:
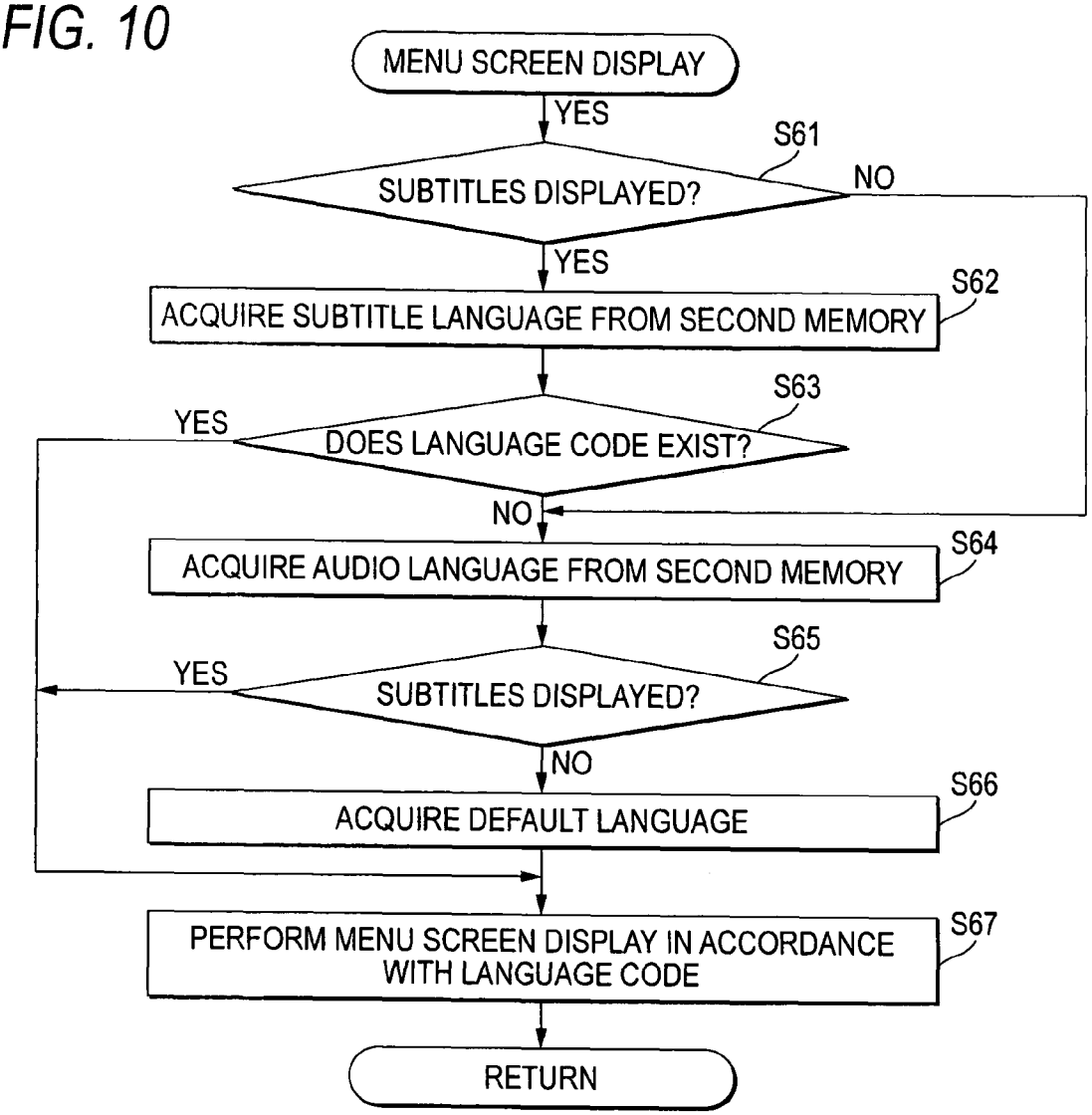
FIG. 10 is a flowchart illustrating the operations of the menu screen display process of the disc reproducing apparatus of a third embodiment of this invention.
Figure 11:
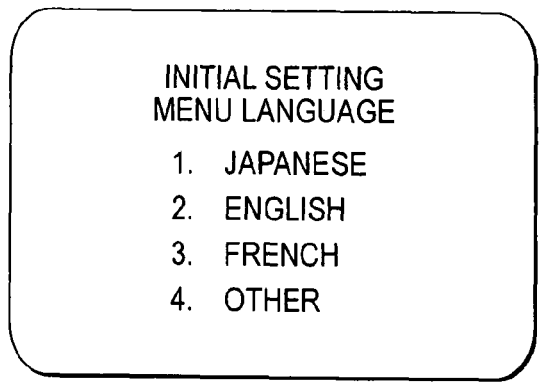
FIG. 11 is a diagram showing a menu language setting screen of a conventional disc reproducing apparatus.

FIG. 10 is a flowchart illustrating the menu screen display process. In step S61, it is judged whether or not subtitles are displayed during contents reproduction. If subtitles are not displayed, step S64 is entered. If subtitles are displayed, the language code of the subtitle language is acquired from the second memory in step S62.

In step S63, it is judged whether or not the language code acquired in step S62 exists in the table of languages displayable in the menu screen, which is recorded in the disc D. If the language code acquired in step S62 exists in the language table, step S67 is entered. If the language code acquired in step S62 does not exist in the language table, step S64 is entered.

In step S64, the language code of the audio language is acquired from the second memory. In step S65, it is judged whether or not the language code acquired in step S64 exists in the language table displayable in the menu screen, which is recorded in the disc D. If the language code acquired in step S64 exists in the language table, step S67 is entered. If the language code acquired in step S64 does not exist in the language table, the language code of the default language that is recorded in the disc D is acquired in step S66.

In step S67, the menu screen is displayed with the language corresponding to the language code acquired in step S67 as the menu language. The same menu screen as that of FIG. 6 or FIG. 7 is thereby displayed. When the menu screen is displayed, a return to the flowchart of FIG. 2 is performed.

With the present embodiment, since the menu language is not set by user operation, the disc reproducing apparatus 1 that is easier to use can be provided. Also, as in the second embodiment, even when the subtitle and the audio language are set by a program recorded in the disc D, the menu screen can be displayed in a menu language that is the same as the subtitle language or the audio language in which the contents are reproduced. The disc reproducing apparatus 1 that is easier to use can thus be provided.

This invention can be used as a disc reproducing apparatus for reproducing a disc, such as a DVD, Video-CD, HD DVD (registered trademark), Blue Ray Disk, etc., in which video data and audio data are recorded.

What is claimed is:

1. A disc reproducing apparatus, reproducing a disc in which a content, including video data and audio data, and a menu screen supporting a plurality of languages, are recorded, the disc reproducing apparatus comprising:
   a memory, configured to store a language information indicating a subtitle language included in a subtitle of the content and an audio language used in a sound of the content, the content being reproduced; and
   a controller, configured to set a menu language based on the language information while the content is reproduced, the menu language being displayed on the menu screen, wherein:
   the controller is configured to determine whether the subtitle is displayed while the content is reproduced;
   the controller is configured to determine whether the menu screen supports the subtitle language indicated by the language information in a case where the controller determines that the subtitle is displayed while the content is reproduced;
   the controller is configured to determine whether the menu screen supports the audio language indicated by the language information, in a case where the controller determines that the subtitle is not displayed while the content is reproduced or that the menu screen does not support the subtitle language indicated by the language information;
   the controller is configured to set the menu language to the subtitle language indicated by the language information, in a case where the controller determines that the menu screen supports the subtitle language indicated by the language information;
   the controller is configured to set the menu language to the audio language indicated by the language information, in a case where the controller determines that the menu screen supports the audio language indicated by the language information; and
   the controller is configured to set the menu language to a preset language which is preset as the menu language in the disc, in a case where the controller determines that the menu screen does not support the audio language indicated by the language information.

2. The disc reproducing apparatus according to claim 1, further comprising:
   menu language setting means for setting the menu language on a setting screen,
   wherein the menu language setting means has a first setting item, and in a case where the first setting item is selected by a user, the menu language is set to the subtitle language indicated by the language information.

3. The disc reproducing apparatus according to claim 2, wherein the menu language setting means has a second setting item, and
   in a case where the second setting item is selected by the user, the menu language is set to the audio language indicated by the language information.

4. The disc reproducing apparatus according to claim 3, wherein, in the case where the first setting item is selected and the controller determines that the subtitle is not displayed while the content is reproduced, the menu language is set to the audio language indicated by the language information.

5. The disc reproducing apparatus according to claim 3, wherein the setting screen comprises a plurality of pages that are displayed switchingly by the user, and the first and second setting items are displayed in a head page.

6. The disc reproducing apparatus according to claim 1, further comprising:
   the menu language setting means for setting the menu language on a setting screen,
   wherein the menu language setting means has a setting item,
   in a case where the setting item is selected by a user the menu language is set to the audio language indicated by the language information.

7. The disc reproducing apparatus according to claim 6, wherein the setting screen comprises a plurality of pages that are displayed switchingly by the user, and the setting item is displayed in a head page.

8. The disc reproducing apparatus according to claim 1, wherein the subtitle language of the content and the audio language of the content are set by a program recorded in the disc.

* * * * *